April 5, 1960     H. H. HOEKJE     2,931,704
SODIUM DICHROMATE PRODUCTION
Filed June 16, 1958
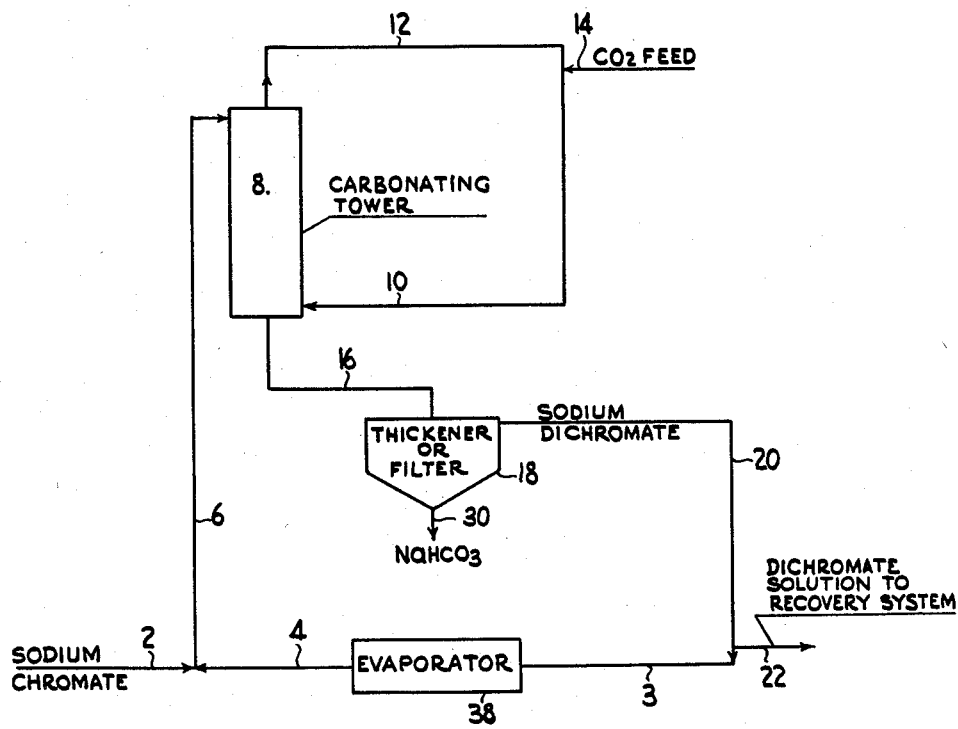
INVENTOR.
HOWARD H. HOEKJE
BY
ATTORNEY United States Patent Office 2,931,704
Patented Apr. 5, 1960

2,931,704

SODIUM DICHROMATE PRODUCTION

Howard H. Hoekje, Corpus Christi, Tex., assignor to Columbia-Southern Chemical Corporation, Allegheny County, Pa., a corporation of Delaware Application June 16, 1958, Serial No. 742,172

3 Claims. (Cl. 23—56)

This invention relates to a method of preparing sodium dichromate. Conventionally, the production of sodium dichromate has been effected using chromite ore as the raw material. The chromite ore, which has the approximate composition $FeOCr_2O_3$, normally is heated with soda ash or potassium carbonate, with consequent formation of sodium or potassium chromate. The resulting sodium or potassium chromate is extracted from the calcined mixture and the chromate solution thus produced is reacted with acid to convert the monochromate solution to dichromate. In most cases, this acid has been sulphuric acid.

In a few cases, carbon dioxide has been used as the acid for conversion of alkali metal monochromate solution to alkali metal dichromate solution. In such a case, substantially complete conversion of the chromate to dichromate has been achieved only with difficulty. That is, to achieve complete conversion of monochromate to dichromate, it has been necessary to conduct the process in a plurality of stages in which the sodium chromate solution or the like first is subjected to the action of carbon dioxide, converting only a portion of the chromate to dichromate, and then the solution is evaporated to a higher concentration and is treated a second time with carbon dioxide. While this process can be conducted effectively, it is expensive because of the additional equipment and the additional number of operations which must be performed.

According to the present invention, it has been found that conversions of monochromate to dichromate in excess of 85 to 90 percent of the chromate to dichromate can be conveniently effected by establishing an aqueous solution which initially contains $CrO_3$ in an amount above that equivalent to the solubility of sodium monochromate at the carbonation temperature (calculated as $CrO_3$), generally at least about 35 percent by weight of $CrO_3$ as monochromate and dichromate, the sodium monochromate content being at least about 5 percent by weight; at least about 20, preferably above 50, percent by weight of the $CrO_3$ in the solution being in the form of dichromate.

Applicant has found that by carbonation of such a solution, it is possible to achieve conversions in the range of 90 to 95 percent of the chromate to dichromate without recourse to an intermediate evaporation or concentration step. Normally, the carbonation is conducted at 10 to 75° C. although higher temperatures (rarely above 150° C.) can be used where carbonation is conducted under pressure. The amount of water should be sufficient to dissolve substantially the entire $CrO_3$ content of the solution.

In the normal practice of the process as herein contemplated, an aqueous solution of sodium monochromate is prepared by leaching the calcined mixture of sodium carbonate and chromite ore which is produced according to conventional methods. The leaching and concentration of the leached solution is normally conducted in a manner such as to produce a saturated or near saturated solution, usually containing in excess of 40 percent by weight of sodium chromate. Thereafter, this sodium monochromate solution is mixed with an aqueous solution of sodium dichromate which contains a higher $CrO_3$ concentration than does the monochromate solution.

The resulting mixed solution is then subjected to the action of carbon dioxide by convenient means, such as by countercurrent contact in a tower or column. This produces an aqueous slurry of precipitated sodium bicarbonate and a solution of sodium dichromate in which well above 85 percent, usually in the range of 90 to 95 percent, by weight of the monochromate has been converted to dichromate. The dichromate solution is then recovered and a portion thereof is concentrated to a concentration above about 35 percent by weight of $CrO_3$ and is recycled for mixing with further sodium monochromate solution.

The accompanying drawing diagrammatically illustrates the manner in which the process may be performed. As therein shown, an aqueous stream of sodium monochromate solution containing in excess of 40 percent by weight of sodium chromate is fed continuously through line 2 and is mixed with an aqueous solution of sodium dichromate flowing continuously through line 4 and containing $CrO_3$ content higher than that contained in the sodium chromate solution. Normally, the dichromate content of the solution flowing through line 4 is equivalent to at least 35 percent by weight of $CrO_3$ per liter.

The resulting mixture is transmitted through line 6 to the top of the carbonating tower 8 where it is contacted countercurrently with carbon dioxide which enters the tower through line 10. The carbon dioxide is fed at a rate faster than it is absorbed, and the gas escaping from the top of the tower is returned through line 12 to line 10. Fresh carbon dioxide is mixed with the recycling carbon dioxide being fed through line 14.

The result is to produce a slurry of solid sodium bicarbonate suspended in an aqueous solution of sodium dichromate which contains a small concentration of sodium chromate. This slurry is discharged from the bottom of the tower through line 16 and is delivered to a conventional thickener or filter 18 where the solution is separated from the sodium bicarbonate. The sodium bicarbonate is withdrawn from the bottom of the thickener through line 30 and is processed by conventional means. The aqueous dichromate solution is withdrawn from the top of the thickener, or at least the upper portion thereof, through line 20. A portion of the dichromate solution is sent forward through line 22 to a conventional recovery system. Another portion of the dichromate solution is recycled through line 3 to an evaporator 38 to concentrate the dichromate solution to a $CrO_3$ content above about 35 percent by weight, and the concentrated solution is recycled through line 4 for mixing with further sodium chromate.

By performance of the process as described above, it is possible to effect the desired high conversion of chromate to dichromate in a single pass and without precipitation of dichromate during the course of the carbonation. This is desirable since, if the dichromate is precipitated, its separation from the solid precipitated sodium bicarbonate requires further operations which add to the general expense of the process.

The following are typical examples:

*Example I*

A substantially saturated aqueous sodium chromate solution containing about 50 percent by weight of sodium chromate was mixed with an aqueous solution containing about 57 percent by weight of dichromate and 6 percent by weight of sodium chromate. This mixture was used as a feed to a carbonating tower, and the feed thus produced contained about 43.1 percent $CrO_3$ as sodium chromate and dichromate, the sodium chromate concentration being 25 percent by weight. This feed was fed continuously to a tower 13 feet high and one foot in diameter. Carbon dioxide was introduced into the base of the tower more rapidly than it was absorbed, and the unreacted carbon dioxide was collected and recycled, as shown in the drawing.

To initiate the process, the tower was filled with the feed liquor and the liquor was fed to the top of the tank and withdrawn from the bottom of the tower at the rate of 11.1 gallons per hour. Carbon dioxide was introduced into the tower fast enough to establish and maintain a carbon dioxide pressure of 125 pounds per square inch gauge at the top of the tower, using substantially pure carbon dioxide fed into the bottom of the tower. The carbon dioxide which was undissolved was collected from the top of the tower and mixed with enough fresh carbon dioxide to make up for that consumed and the mixture was recycled. The carbon dioxide was fed into the bottom of the tower at the rate of about 200 pounds per hour, and make-up carbon dioxide was added to the recycling carbon dioxide at a rate of 20 pounds per hour. The time of retention of the liquid within the column was about 8.2 hours. The feed of liquor under these conditions was continued over a period of 24 hours, the total $CrO_3$ content of the liquor ranging from 42.8 to 43.0 percent by weight.

The sodium chromate content of the liquor withdrawn from the bottom of the column ranged from 5.7 to 5.0 percent by weight, thus indicating a conversion of 91.5 to 92.6 percent of the chromate to dichromate. The temperature of the column during thi period of treatment was maintained at 40° C. at the top thereof and 30° C. at the bottom.

*Example II*

A substantially saturated aqueous sodium chromate solution containing 5,436 pounds of $Na_2CrO_4$ and 5,436 pounds of water is mixed with an aqeuous solution containing 969 pounds of $Na_2CrO_4$, 10,362 pounds of $Na_2Cr_2O_7$, and 6,944 pounds of water. This mixture is used as a feed to a carbonating tower, as in Example I, and the product thus produced contains 1,349 pounds of $Na_2CrO_4$, 14,450 pounds of $Na_2Cr_2O_7$, 12,099 pounds of water, and 2,622 pounds of solid sodium bicarbonate. This mixture is filtered to remove the sodium bicarbonate and the filtrate is concentrated by evaporation to produce a solution which contains 1,344 pounds of $Na_2CrO_4$, 14,450 pounds of $Na_2Cr_2O_7$, and 9,682 pounds of water. A portion of the solution containing 380 pounds of $Na_2CrO_4$, 4,088 pounds of $Na_2Cr_2O_7$, and 2,738 pounds of water is withdrawn for processing to recover dichromate. The balance is recycled.

It will be understood that the sodium monochromate solutions referred to in the above examples and elsewhere may be partially reacted with carbon dioxide prior to mixing with the dichromate solution, if desired. Thereafter, the dichromate solution may be added and carbonation continued.

Although the present invention has been described with reference to the specific details of certain embodiments, it is not intended that such embodiments shall be regarded as limitations upon the scope of the invention except insofar as included in the accompanying claims.

What is claimed is:

1. A method of preparing sodium dichromate which consists of the steps of: (1) leaching a calcined mixture of chromite ore and sodium carbonate to produce a concentrated aqueous solution of sodium chromate, (2) adding to such solution an amount of sodium dichromate sufficient to produce a solution having a $CrO_3$ content higher than that equivalent to the solubility of the sodium chromate in water, (3) carbonating the solution, (4) mixing a portion of the sodium dichromate thus obtained with a further portion of said chromate solution, and (5) carbonating the mixture.

2. The process according to claim 1 wherein the dichromate solution obtained is concentrated before it is mixed with the further portion of the chromate solution.

3. The process according to claim 1 wherein the sodium chromate solution to which the dichromate is added contains at least 40 percent by weight of sodium chromate.

References Cited in the file of this patent
UNITED STATES PATENTS 2,027,477   Hockhofer et al. _____ Jan. 14, 1946